United States Patent [19]
Greenaway

[11] 4,129,382
[45] Dec. 12, 1978

[54] METHOD AND APPARATUS FOR STORING AND READING AUTHENTICATING INFORMATION

[75] Inventor: David L. Greenaway, Birchwil, Great Britain

[73] Assignee: Landis & Gyr, Zug, Switzerland

[21] Appl. No.: 712,751

[22] Filed: Aug. 9, 1976

[30] Foreign Application Priority Data

Aug. 14, 1975 [CH] Switzerland ............... 010602/75

[51] Int. Cl.² .......................................... G02B 27/38
[52] U.S. Cl. ................................. 356/71; 250/550; 350/162 R
[58] Field of Search .............. 356/71, 111; 250/550; 340/146.3 F, 146.3 G, 146.3 P

[56] References Cited
U.S. PATENT DOCUMENTS

| 3,412,493 | 11/1968 | French | 340/146.3 P |
| 3,633,037 | 1/1972 | Langenbeck | 356/111 |
| 3,689,772 | 9/1972 | George et al. | 340/146.3 F |
| 4,023,010 | 5/1977 | Horst et al. | 340/146.3 P |

OTHER PUBLICATIONS

Samson, J. A. R. Efficiency of Aluminized Gratings in the Spectral Range 555 to 1600A°, Jr. of Optical Soc. of America, vol. 52, 5-1962.

Primary Examiner—John K. Corbin
Assistant Examiner—Wm. H. Punter
Attorney, Agent, or Firm—Burns, Doane, Swecker & Mathis

[57] ABSTRACT

A method and apparatus are provided for storing and reading authenticating information which is recorded on a carrier comprising at least one diffraction screen for modifying the path of a beam from an optical reading apparatus consisting of a light-source and a light-receiver. A method is provided for producing an information carrier having at least one diffraction screen.

8 Claims, 10 Drawing Figures

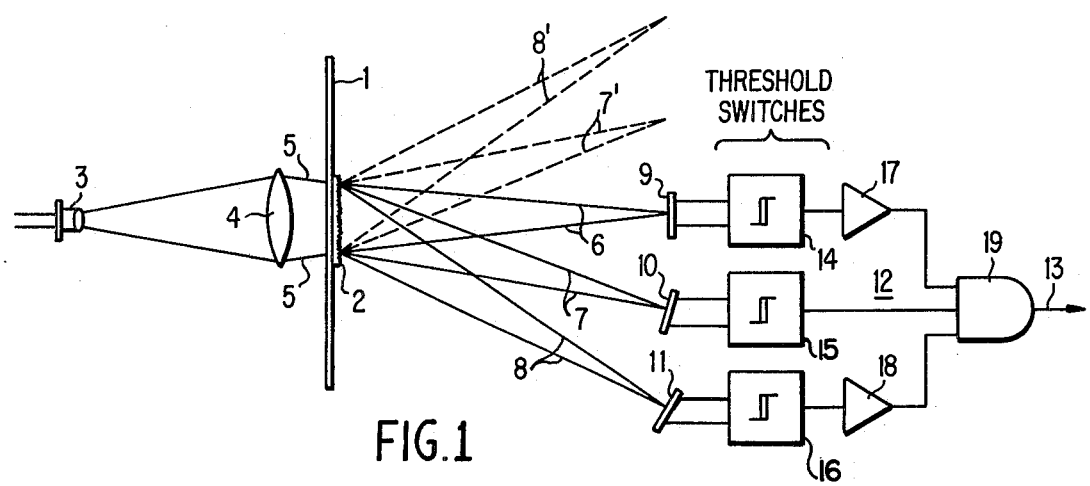
FIG.1
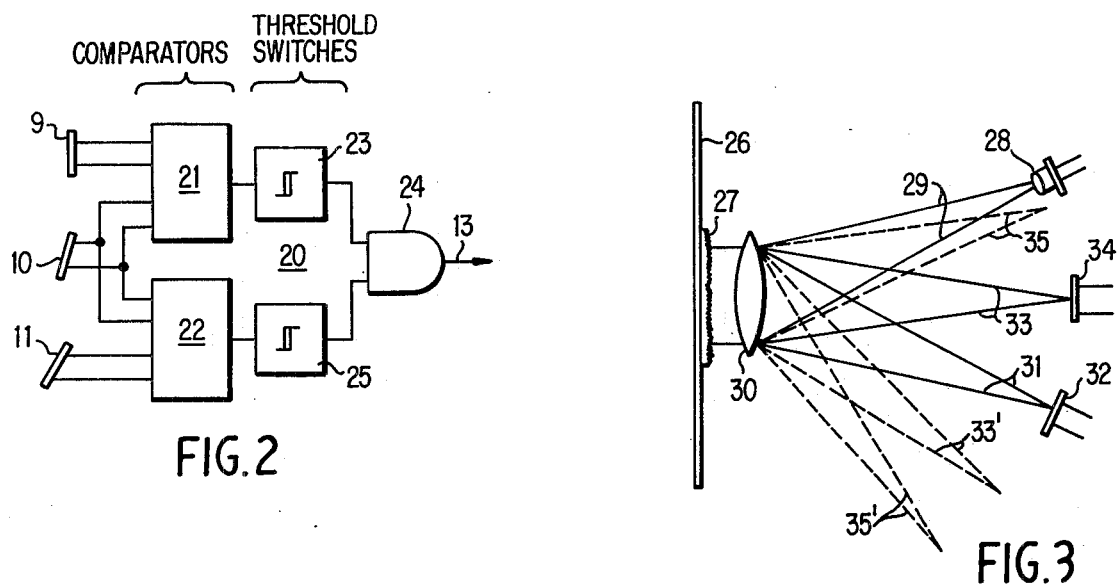
FIG.2
FIG.3
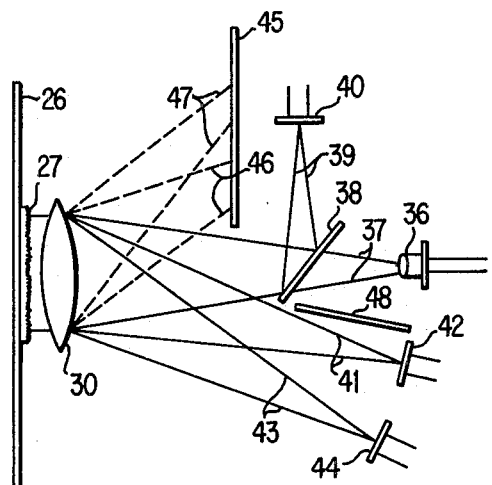
FIG.4

METHOD AND APPARATUS FOR STORING AND READING AUTHENTICATING INFORMATION

BACKGROUND OF THE INVENTION

Most currently used credit cards, personal identity cards, passes, season tickets, admission cards, bank-notes, cheques, etc. can be forged or falsified with little difficulty using modern reproduction methods. Accordingly, numerous attempts have been made to store authenticating information on such identifying cards, bank-notes and the like, to increase the difficulty of forgery. For example, authenticating information may be recorded in the form of magnetic or optical markings which can be read with the aid of a machine.

An effective, known method for protection against forgery is provided by a credit card which can be read with the aid of a machine, carrying a hologram which constitutes the holographic reproduction of a particular pattern of discrete light-spots. However, the reading of such holograms requires the use of expensive reading apparatus comprising a high-capacity light-source and sensitive light-receivers, since the transfer efficiency of the holograms is low, i.e., only a small proportion of the transmission energy reaches the light-receivers.

Also known is an identifying card having a diffraction screen which, in the reading apparatus, deflects the reading light-beam, produced by a laser, in a certain direction on to a single photo-detector. This arrangement does not, however, ensure satisfactory safety as regards forgeries, since even with low-quality imitations of the diffraction screen- perhaps by using other simpler optical elements — it is possible to cause a sufficient amount of light to strike the photo-detector and to cause the latter to give an erroneous indication of authenticity.

The object of the present invention is to provide an apparatus for storing and reading authenticating information which combines the forgery protection afforded by holographic storage with the high transfer efficiency of the known system that uses a diffraction screen storage.

It is another object of the present invention to provide an inexpensive means and method for storing and reading information or, a carrier to provide a reliable indication of authenticity of the carrier or data associated therewith.

These and other objects and features of the invention will become apparent from the claims and from the following description when read in conjunction with the appended drawings.

THE DRAWINGS

FIG. 1 is a schematic representation of an apparatus for storing and reading authenticating information on an information carrier which can be read by transmission.

FIG. 2 is a schematic representation of an alternate embodiment of the detector portion of the embodiment of FIG. 1.

FIGS. 3 and 4 are schematic representations of apparatuses for reading an information carrier which can be read by reflection.

DETAILED DESCRIPTION

Figure 5:
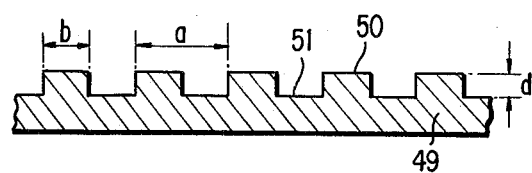
FIG. 5 is a magnified cross-sectional view of a diffraction screen of an embodiment of the present invention.

An apparatus for storing and reading authenticating information may include a diffraction screen with a well-defined structure representing the authenticating information. A reading apparatus may include a light-receiver consisting of at least two photo-detectors, arranged in different diffraction orders, and a decision logic system connected thereto, which system sends an authenticity signal when the proportions of energy in the diffraction orders, associated with the photo-detectors, stand in a predetermined relationship with each other.

A method of producing an information carrier having at least one diffraction screen is characterized in that a photo-sensitive layer is applied to a substrate, and the layer is illuminated with a spatially modulated wave-front and is then developed. A master diffraction screen is formed from the profile so obtained, and one or more diffraction screens are impressed in the information carrier by means of the master diffraction screen.

The diffraction screens employed in embodiments of the present invention may be optical bodies of periodically varying optical thickness or diffraction gratings, such as an optically transparent body with approximately parallel, elongated ridges formed therein.

Embodiments of the invention will now be described in greater detail by reference to the attached drawings.

FIG. 1 shows an information carrier 1 which has a diffraction screen 2 designed as a transmission screen. The information carrier 1 is preferably an identifying card, i.e. a credit card, personal identity card, season ticket or the like. Advantageously, it may also take the form of a tape which is contained in a cassette and is used for the non-cash payment for goods or services. As explained in more detail below, the diffraction screen 2 has a specific structure which represents the authenticating information. The information carrier may also contain a plurality of similar or different diffraction screen of which the spatial arrangement, periodicity and/or orientations represent numerical or alphanumerical information, the presence or absence of a particular diffraction screen at or from a particular place on the information carrier 1 representing a bit of a binary code. In FIGS. 1, 3 and 4, the invention is explained using the example of an information carrier 1 which has a single diffraction screen, the apparatus for reading the authenticating information, here described, can be used in a corresponding manner for all the diffraction screens provided on the information carrier, and use can be made of a plurality of like or similar reading apparatuses or of a single reading apparatus which operates sequentially when the information carrier is moved continuously or intermittently.

The information carrier 1 with the diffraction screen 2 can be embedded between two covering layers which protect the diffraction screen 2 against inadvertent damage and which make it difficult to produce unauthorized copies by moulding or casting. These covering layers may be opaque to visible light, so that the diffraction screen 2 cannot be detected by the naked eye, and reading of the authenticating information is only possible under light of a particular wave-length, for example, under infra-red light.

A light source 3, preferably a Ga-As light emitting diode, projects a reading light beam 5 onto the diffraction screen 2 through a lens 4. The diffraction screen 2 splits up the reading light beam 5 into a group of beams, which emerge from the information carrier 1 in a plane at right-angles to the lines of the diffraction screen, on the side of the information carrier that is remote from the light source 3. For the sake of simplicity, the drawing only shows the emerging light beams 6 of the zero order of diffraction, the beams 7 for the first order of diffraction, and the beams 8 for the second order of diffraction, and, in broken lines, the merging light beams 7' for the conjugated first order of diffraction and the beams 8' for the conjugated second order of diffraction. Photodetectors 9 to 11 are arranged respectively in the focal points of the zero, first and second orders of diffraction. The photodetectors 9 to 11 are connected to a decision logic device 12 which produces an authenticity signal at its output 13 when the proportions of energy in the diffraction orders associated with the photodetectors 9 to 11 are in a predetermined relationship with each other.

In the FIG. 1 example, the decision logic device 12 comprises three threshold switches 14 to 16, two inverters 17 and 18 and an AND-gate 19. The photodetector 9 is connected to a first input of the AND-gate 19 by way of the threshold switch 14 and the inverter 17, the photodetector 10 is connected to a second input by way of the threshold switch 15, and the photodetector 11 is connected to a third input by way of the threshold switch 16 and the inverter 18.

The AND-gate 19 produces an authenticity signal when the proportion of energy in the first order of diffraction preponderates, that is when the voltage at the photodetector 10 exceeds the threshold value of the threshold switch 15 and the latter triggers, and when, on the other hand, the voltage at the photodetectors 9 and 11 does not reach the threshold value of the threshold switches 14 and 16.

If a genuine or authentic information carrier 1 is inserted in the reading apparatus, the energy from the light source 3 is deflected into the several orders of diffraction in a predetermined ratio in dependence upon the specific characteristic structure of the diffraction screen 2, and an authenticity signal is produced at the output 13. If, however, the information carrier 1 is forged and does not contain a diffraction screen at all, or its diffraction screen does not exhibit all the characteristic features such as periodicity, orientation, particular profile features, etc., the energy from the light source 3 is not deflected in the correct ratio onto the photodetectors 9 to 11, and the decision logic device 12 does not produce an authenticity signal.

Referring to FIG. 2, the above-described decision logic device may advantageously take the form of the device designated by the numeral 20. The same reference numerals are used in this figure as in FIG. 1 for indicating like parts. The photodetectors 9 and 10 are connected to a comparator 21, and the photodetectors 10 and 11 are connected to a comparator 22. The comparator 21 is connected to a first input of an AND-gate 24 by way of a threshold switch 23, and the comparator 22 is connected to a second input of the AND-gate 24 by way of a threshold switch 25.

The comparator 21 compares the output signals from the photodetectors 9 and 10, and the comparator 22 compares the output signals from the photodetectors 10 and 11. The logic state of the threshold switches 23 and 25 depends upon whether the ratio of the compared signals lies within or outside predetermined limits. An authenticity signal is again produced at the output 13 of the decision logic device 20 when the proportions of energy in the orders of diffraction associated with the photodetectors 9 to 11 are in a predetermined relationship with each other. Compared with the decision logic device 12, the device 20 offers the advantage of largely off-setting the effect of instability in the intensity of the light source 3.

The authenticating information can also be stored on the information carrier by using a diffraction screen designed as a reflection screen. FIG. 3 shows an information carrier 26 having such a diffraction screen 27 which can be read by reflection. A reading light beam 29 emanating from a light source 28 passes to the diffraction screen 27 by way of a lens 30, is reflected by the diffraction screen 27 and is split up into the various orders of diffraction. A reflected light beam 31 of the zero order of diffraction is received by a photodetector 32, and a light beam 33 of the first order of diffraction is received by a photodetector 34.

FIG. 3 also shows, in broken lines, a light beam 35 of the second order of diffraction, a light beam 33' of the conjugated first order of diffraction, as well as a light beam 35' of the conjugated second order of diffraction; these are not detected in the example illustrated.

The photodetectors 32 and 34 are connected to a decision logic device, not shown in FIG. 3, the general design of which may correspond to that of the decision logic device 12 (FIG. 1) or the decision logic device 20 (FIG. 2).

The axis of the reading light beam 29 passes through the plane of the diffraction screen 27 at an oblique angle. As a result, the zero order of diffraction does not coincide with the axis of the reading light beam 29, and therefore the proportion of energy of the zero order of diffraction can be determined by means of the photodetector 32 without the need for using additional optical elements. It is, of course, possible to direct the reading light beam 29 at right angles onto the diffraction screen 27 if it is not required to detect the proportion of energy of the zero order of diffraction and instead to ascertain, for example, the porportion of energy of the second order of diffraction and to compare it with that of the first order of diffraction.

FIG. 4 shows an arrangement in which the proportion of energy of the zero order of diffraction can be determined, although a light source 36 projects a reading light beam 37 at right angles onto the diffraction screen 27. Arranged between the light source 36 and the lens 30 is a semi-translucent mirror 38, which directs a reflected light beam 39 of the zero order of diffraction on to a photodetector 40. Arranged in the focal point of a light beam 41 of the first order of diffraction is a photodetector 42, and in the focal point of the light beam 43 of the second order of diffraction, a photo detector 44. A shutter 45 screens the photodetector 40 from the light beams 46 and 47 of the conjugated orders of diffraction. Also, a shutter 48 protects the photodetectors 42 and 44 against interference from the reading light beam 37 which is partly reflected on the mirror 38. The photodetectors 40, 42 and 44 can be connected to the decision logic device 12 (FIG. 1) or to the decision logic device 20 (FIG. 2).

The diffraction screen 2 (FIG. 1) and the diffraction screen 27 (FIGS. 3 and 4) are preferably of such kind that a major proportion of energy is directed into the first order of diffraction. This provision results in optimum transmission efficiency. Best suited for the purpose is a diffraction screen, the groove cross-section of which is symmetrical rectangular in form.

FIG. 5 shows a diffraction screen 49 of this kind. The screen constant is designated by a, the groove width by b, and the groove depth by d. The transmission efficiency $\eta_0$ of the zero order or diffraction of this screen is:

$$\eta_0 = [1 - 2p(1-p)(1-\cos\phi)]$$

and the transmission efficiency of $\eta_n$ of the $n^{th}$ order of diffraction is:

$$\eta_c = 2\left[\frac{\sin n\pi(1-p)}{n}\right]^2(1-\cos\phi)$$

wherein $p = b/a$ is the side-ratio of the groove structure, and $\phi$ is the phase difference of the reading light beam between the upper plane 50 and the lower plane 51 of the groove of rectangular cross-section. The phase difference $\phi$ is dependent upon the wave-length of the reading light beam, upon the depth d of the groove and, of course, upon the refractive index of the screen material.

Figure 6:
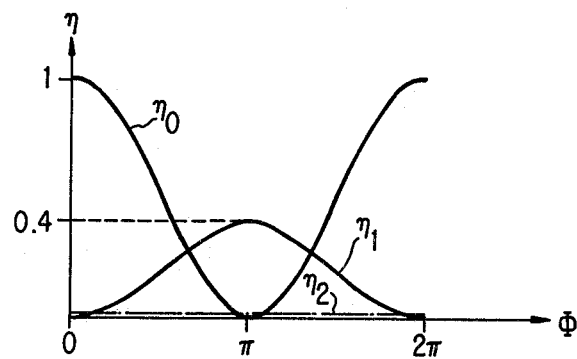
FIG. 6 is a graph plotting light transmission efficiency and phase difference.

In FIG. 6 the transmission efficiency $\eta$ is plotted against phase difference $\phi$ for the preferred case wherein the rectangular cross-section of the grooves of the diffraction screen 49 is symmetrical that is where p = 0.5. When $\phi = \pi$, the transmission efficiency $\eta_1$ of the first order of diffraction reaches the maximum value of approximately 0.4, whereas the transmission efficiency $\eta_0$ of the zero order of diffraction is zero at this point. Similar relationships exist when the phase difference $\phi$ is an odd number multiple of $\pi$.

Thus, with a symmetrical rectangular groove cross-section an optimum transmission efficiency $\eta_1$ of the first order of diffraction is obtained if the depth d of the groove and the wave-length of the reading light beam are so related to each other that a phase difference $\phi$ of the reading light beam of or of an odd number multiple of $\pi$ occurs between the upper plane 50 and the lower plane 51 of the groove cross-section. The symmetrical rectangular groove cross-section constitutes the optimum as regards transmission efficiency and protection against forgery. Deviations from the value p = 0.5 or from the rectangular groove cross-section lead to a reduction in the transmission efficiency $\eta_1$ of the first order of diffraction and to an increase in the transmission efficiency $\eta_0$ and $\eta_2$ of the zero and second order of diffraction.

The advantages can now be readily appreciated. Information carriers with diffraction screens whose specific structure represents the authenticated information can only be forged with great technical difficulty for which purpose are required technical aids difficult to obtain and deep knowledge in a specialized field of modern physics. In contrast with the storage of authenticated information with the aid of holograms, a very high transmission efficiency is achieved in one of the orders of diffraction when the described diffraction screen is used, so that the optical reading apparatus for reading off the authenticated information can be constructed using simple means. Forgeries can be detected in a very reliable manner since only diffraction screens, whose structure corresponds to the required structure in all details, split up the reading light beam into the various orders of diffraction in the predetermined ratio. As will be shown in the following, the authorized manufacturer possessing the required equipment and technical knowledge is nevertheless able to produce information carriers having such diffraction screens economically and on a mass-production basis.

The information carrier is provided with the authenticating information preferably with the aid of what is called master diffraction screen. In this method a photosensitive layer is preferably applied to a substrate, this layer is illuminated with a spatially modulated wavefront and is developed, and the master diffraction screen so provided is impressed in an information carrier preferably made of plastic material.

The photosensitive layer is preferably made of photoresist material from which portions corresponding to the illuminated pattern are dissolved out during developing. This enables a groove cross-section to be directly produced in an extremely simple manner.

Illumination is advantageously carried out with two interfering coherent light beams. Interference results in a sinusoidal variation in the illumination intensity in one direction of the photosensitive layer. Since, under normal exposure and developing conditions, photoresist material exhibits a linear developing behaviour, a groove cross-section of sinusoidal form is generally obtained in this way. However, special steps can be taken to ensure that the groove cross-section has the rectangular form here preferred. A strictly rectangular cross-section of groove can be obtained by using the procedure illustrated in FIG. 7.

Figure 7A:
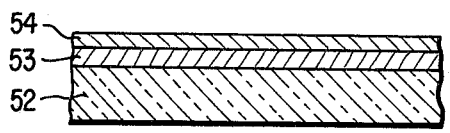
FIGS. 7a through 7d are sequential cross-sectional views of the diffraction screen of an embodiment of the present invention illustrating the fabrication of the screen.
Figure 7B:
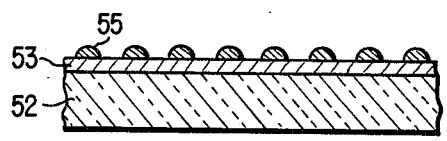
Figure 7C:
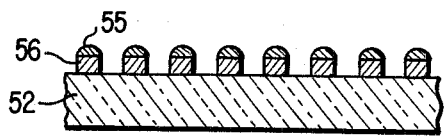
Figure 7D:
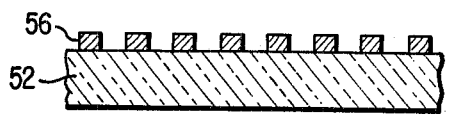

In FIG. 7a, a substrate 52 is made of glass for example. A metal coating 53, preferably of chromium, is applied to the substrate 52 by vapour-deposition, spraying or some other suitable method, the well-defined thickness of the metal coating 53 corresponding to the depth d (FIG. 5) of the grooves of the diffraction screen that is to be produced. A thin photosensitive coating 54 of photoresist material covers the metal layer 53. The photosensitive layer 54 is illuminated by two interfering cohernt light beams. If a suitable wave-length and angle of incidence are selected for these light beams, then as shown in FIG. 7b, discrete lines 55 of photoresist material remain on the metal layer 53 after the photosensitive layer 54 has been developed, which lines, although of random cross-section, nevertheless have the required screen constant a and groove width b, (FIG. 5). The free zones of the metal layer 53 are removed by means of a etching agent, so that, as shown in FIG. 7c, discrete lines 56 of rectangular cross-section still remain. Finally, the lines 55 of the developed photosensitive layer are removed with a solvent. FIG. 7d shows the master diffraction screen so obtained.

Exposure can also be carried out with incoherent light through an absorbent diffraction screen which lies in close contact with the photosensitive layer 54.

Another advantageous possible method of forming a rectangular groove cross-section comprises directly coating a substrate with a photosensitive layer of photoresist material, exposing the latter to two interfering coherent light beams providing a very large quantity of light, and developing the photosensitive layer using a very short developing time. The intense exposure and the brief developing time results in an exponential developing characterisitc so that despite sinusoidal variation of the light intensity in one direction of the photosensitive layer, a groove formation of rectangular cross-section is obtained. The exposure and developing parameters suitable for this method depend upon a number of peripheral requirements and are best determined on an experimental basis. The required thickness of the photosensitive layer can also be determined by tests. Since unexposed areas of the photosensitive layer are removed in very small quantities during developing, the thickness of this layer must be somewhat greater than the depth d of the grooves that are to be formed.

A metallic print of the relief structure made of photoresist material can be produced by chemical deposition or electrodeposition on the grooved surface, and this print can be used as the master diffraction screen.

The principles, preferred embodiments and modes of operation of the present invention have been described in the foregoing specification. The invention which is intended to be protected is not, however, to be construed as limited to the particular forms disclosed, since these are to be regarded as illustrative rather than restrictive. Variations and changes may be made by those skilled in the art without departing from the spirit and scope of the present invention.

What is claimed is:

1. A method of providing and reading an authenticating indicia on a carrier comprising the steps of:
   disposing a diffraction grating on the carrier said diffraction grating producing a phase shift in a portion of light incident thereon to diffract the incident light into a plurality of diffraction orders having a predetermined ratio of light intensities;
   impinging the diffraction grating with a light beam wherein the wave length of the light beam and the structure of the grating are selected to maximize the light diffraction efficiency of the grating for a predetermined diffraction order of the grating;
   receiving light diffracted by the grating at a first predetermined location in a path of the diffraction order of the light beam;
   receiving light diffracted by the grating at a different predetermined location in a path of another diffraction order of the light beam; and,
   producing an indication of authenticity when the energies of the light received at the locations are in a predetermined proportion to one another.

2. The method of claim 1 wherein the diffraction grating has grooves of symmetrical rectangular cross-section, wherein the depth of grooves in the diffraction grating and the wave-length of the light beam are so related to each other that a phase difference of the reading light beam of $\pi$ or an odd multiple of $\pi$ occurs between the upper plane and the lower plane of the groove cross-section and wherein the diffraction grating is such that a major proportion of the light beam is deflected into the first diffraction order.

3. An apparatus for authenticating identifying information on a carrier having an optical body of periodically varying optical thickness for producing a phase shift in a portion of light incident thereon to diffract the incident light into a plurality of diffraction orders having a predetermined ratio of light intensities, comprising:
   a light source for beaming a light beam at the optical body wherein the wave length of the light beam and the structure of the grating are selected to maximize the light diffraction efficiency of the optical body for a predetermined diffraction order of the optical body;
   photodetection means, located in paths of different diffraction orders of the optical body including the maximized diffraction order, for detecting the intensity of the diffracted light of each different diffraction order; and,
   means operatively connected to said photodetection means for indicating the authenticity of the information responsive to the detected intensities bearing a predetermined proportion to one another.

4. The apparatus of claim 3 wherein said indicating means includes a threshold switch operatively connected to the photodetection means.

5. The apparatus of claim 3 wherein the indicating means includes comparators connected to said photodetection means.

6. The apparatus of claim 3 wherein the optical body has grooves of symmetrical rectangular cross-section, wherein the depth of grooves in the optical body and the wave-length of the light beam are so related to each other that a phase difference of the reading light beam of $\pi$ or an odd multiple of $\pi$ occurs between the upper plane and lower plane of the groove cross-section and wherein the optical body is such that a major proportion of the light beam is deflected into the first diffraction order.

7. The apparatus of claim 6 wherein said photodetection means comprises a first photodetector located in the path of the first order of diffraction of the light beam and a second photodetector located in the path of the zero order of diffraction of the light beam.

8. The apparatus of claim 7 wherein said photodetection means further comprises a third photodetector located in the path of the second order of diffraction of the light beam.

* * * * *